(12) United States Patent
Kim

(10) Patent No.: US 8,561,771 B2
(45) Date of Patent: Oct. 22, 2013

(54) MOVEABLE CATENARY SYSTEM FOR CARRYING CONTAINERS USING AN ELECTRIC CONTAINER FREIGHT TRAIN

(76) Inventor: YeonWon Kim, Cheonan-si (KR)

( * ) Notice: Subject to any disclaimer, the term of this patent is extended or adjusted under 35 U.S.C. 154(b) by 0 days.

(21) Appl. No.: 13/519,750

(22) PCT Filed: Sep. 28, 2010

(86) PCT No.: PCT/KR2010/006574
§ 371 (c)(1),
(2), (4) Date: Jun. 28, 2012

(87) PCT Pub. No.: WO2011/081282
PCT Pub. Date: Jul. 7, 2011

(65) Prior Publication Data
US 2012/0273316 A1 Nov. 1, 2012

(30) Foreign Application Priority Data
Dec. 28, 2009 (KR) .......................... 10-2009-0131548

(51) Int. Cl.
*B60M 1/18* (2006.01)

(52) U.S. Cl.
USPC .................................. 191/38; 191/39; 191/37

(58) Field of Classification Search
USPC .............. 191/37, 38, 39, 40, 41, 33 R, 34, 35
See application file for complete search history.

(56) References Cited

U.S. PATENT DOCUMENTS

| | | | | |
|---|---|---|---|---|
| 3,033,978 A | * | 5/1962 | Van Dusen, Jr. ............. | 362/391 |
| 4,250,982 A | * | 2/1981 | Senften ........................... | 191/39 |
| 4,679,672 A | * | 7/1987 | Seddon et al. .................. | 191/41 |
| 4,846,320 A | * | 7/1989 | Clarke ........................ | 191/12 R |
| 5,691,888 A | * | 11/1997 | Corvin et al. ................... | 363/65 |
| 5,740,025 A | * | 4/1998 | Siegling et al. ................ | 363/65 |
| 6,025,702 A | * | 2/2000 | Launier et al. ................ | 323/273 |

(Continued)

FOREIGN PATENT DOCUMENTS

| | | |
|---|---|---|
| JP | 56116524 | 9/1981 |
| JP | 2001253271 | 9/2001 |

(Continued)

*Primary Examiner* — Jason C Smith
(74) *Attorney, Agent, or Firm* — IPA P.A.; James E. Bame

(57) ABSTRACT

A moveable catenary system for carrying a container using an electric container freight train includes: a main rail track disposed beside a freight platform; a plurality of catenary masts disposed beside the main rail track; fixed support units fixedly coupled in a cantilever shape to the catenary masts, respectively, with the exception of the catenary masts corresponding to the freight platform; vertical driving support units coupled in the cantilever shape to the catenary masts corresponding to the freight platform so as to vertically rotate the catenary masts, respectively; a fixed catenary coupled to the fixed support units such that positions at which the vertical driving support units are disposed are cut and the vertical driving support units are disposed inside and along the main rail track; a moveable catenary connected to the vertical driving support unit, the movable catenary being circularly moved in a vertical direction according to the vertical rotation of the vertical driving support units; and switching units connecting the moveable catenary to the fixed catenary when the vertical driving support units are disposed in a horizontal direction. According to the present invention, freight cars of the electric container freight train may be moved beside the freight platform to reduce the time required for loading containers into the freight cars of the electric container freight train or unloading containers mounted on the freight cars. Furthermore, the rail track may be simply arranged.

7 Claims, 10 Drawing Sheets

(56) References Cited

U.S. PATENT DOCUMENTS

| | | | |
|---|---|---|---|
| 8,013,469 B2 * | 9/2011 | Masselus | 307/31 |
| 2002/0014383 A1 * | 2/2002 | Brooks | 191/33 R |
| 2010/0133055 A1 * | 6/2010 | Melis Maynar et al. | 191/39 |
| 2011/0094840 A1 * | 4/2011 | Sakita | 191/2 |
| 2012/0061197 A1 * | 3/2012 | Pasta et al. | 191/40 |
| 2012/0085610 A1 * | 4/2012 | Alexandre | 191/10 |
| 2012/0273316 A1 * | 11/2012 | Kim | 191/38 |
| 2012/0319850 A1 * | 12/2012 | Welch et al. | 340/584 |

FOREIGN PATENT DOCUMENTS

| | | |
|---|---|---|
| JP | 2002205579 | 7/2002 |
| KR | 1020060003941 | 1/2006 |
| KR | 100739328 | 7/2007 |

* cited by examiner

MOVEABLE CATENARY SYSTEM FOR CARRYING CONTAINERS USING AN ELECTRIC CONTAINER FREIGHT TRAIN

BACKGROUND OF THE INVENTION

The present invention relates to a moveable catenary system for carrying containers using an electric container freight train.

Containers are used for carrying freight. The containers are easy to pack up and carry luggage and can protect freight put in the containers. The containers are divided into overland containers and marine containers.

The overland containers are mainly carried using trailers or freight trains.

In the case that the containers are carried using the freight train, the containers are carried while the freight train travels back and forth between two or more railroad container distribution stations, where rail tracks are located. The containers loaded at a container yard of the railroad container distribution station are carried to a destination using overland transportation means or marine transportation means.

FIG. 1 is a schematic plan view showing a part of a container carrying system using an electric container freight train according to a prior art.

As shown in FIG. 1, the container carrying system using the electric container freight train according to the prior art is as follows.

A freight platform keeps a certain distance from a main rail track T1 on which the electric container freight train travels.

A container yard A for loading containers thereon is disposed beside the freight platform. The main rail track includes two parallel rails on which the electric container freight train can travel.

A freight loading rail track T2 is disposed between the freight platform A and the main rail track T1. Both end portions of the freight loading rail track T2 are respectively connected with the main rail track T1.

Based on the main rail track T1, an auxiliary rail track T3 is opposed to the freight loading rail track T2. Both end portions of the auxiliary rail track T3 are respectively connected with the main rail track T1.

One end portion of the auxiliary rail track T3 and one end portion of the freight loading rail track T2 meet together at a portion of the main rail track T1, and the portion where they meet together is called a first meeting position.

A portion where the other end portion of the freight loading rail track T2 meets with the main rail track T1 is called a second meeting position, and a portion where the other end portion of the auxiliary rail track T3 meets with the main rail track T1 is called a third meeting position.

A distance between the first meeting position and the second meeting position is longer than a distance between the first meeting position and the third meeting position.

A train standby rail track T4 is disposed beside the freight loading rail track T2. One end portion of the train standby rail track T4 is connected with the main rail track T1. A diesel locomotive stands by on the train standby rail track T4.

Catenary masts are mounted on both sides of the main rail track T1 at predetermined intervals along the main rail track T1.

As shown in FIG. 2, Steel-frame structures 20 are respectively connected to upper ends of a pair of the centenary masts 10, which are opposed to each other.

Suspension wires 30 are respectively mounted on the steel-frame structures 20, and trolley lines 40 are respectively connected to the suspension wires 30.

The trolley line 40 includes a main trolley line 41 located according to the main rail track T1 and an auxiliary trolley line 40 located according to the auxiliary rail track T3.

Now, the operation of the container carrying system using the electric container freight train according to the prior art will be described as follows.

The electric container freight train stops in front of the first meeting position while traveling along the main rail track T1.

The electric container freight train includes electric locomotives, which generates a driving force by receiving electric energy, and a plurality of freight cars connected to the electric locomotive. The freight cars are provided to load containers thereon.

When the electric container freight train stops, the freight cars are separated from the electric locomotive.

The electric locomotive travels again, and then, stops inside the auxiliary rail track T3.

The diesel locomotive, which stops on the train standby rail track T4, reverses along the train standby rail track T4, the main rail track T1 and the freight loading rail track T2, and then, is located at the head of the freight cars.

After the freight cars and the diesel locomotive are connected together, the diesel locomotive moves forward, and then, stops inside the freight loading rail track T2. The diesel locomotive generates a driving force by receiving diesel fuel.

In the state where the diesel locomotive and the freight cars stop inside the freight loading rail track T2, the containers put on the freight cars are lifted up by a rain transfer crane or a reach stacker and moved onto the container yard.

After the containers put on the freight cars are all loaded on the container yard, the diesel locomotive moves forward to the main rail track T1.

After the diesel locomotive and the freight cars stop between the second meeting position and the third meeting position, the diesel locomotive is separated from the freight cars, and then, the diesel locomotive moves forward to the train standby rail track T4 and stops at the train standby rail track T4.

The electric locomotive, which stops at the auxiliary rail track T3, moves forward to the main rail track T1.

After the electric locomotive moves to the main rail track T1, and is connected with the freight cars. After that, the electric locomotive moves forward or backward.

As described above, the container loading and unloading system for carrying containers using the freight train according to the prior art requires lots of time to move the freight cars alongside the freight platform and unload the containers put on the freight cars because the electric locomotive must be separated from the freight cars at the first meeting position and move to the auxiliary rail track T3 and the diesel locomotive must be connected with the freight cars and move to the freight loading rail track T2 so that the rail transfer crane or the reach stacker can unload the containers from the freight cars.

Moreover, the container loading and unloading system according to the prior art has another problem in that the container loading and unloading system is complex in rail track arrangement and requires may system installation costs because it requires a wide site because it needs the train standby rail track T4 where the diesel locomotive stands by, the auxiliary rail track T3 where the electric locomotive stands by, and the freight loading rail track T2 for loading and unloading the containers.

Furthermore, the container loading and unloading system according to the prior art has a further problem in that it causes environmental pollution and generates noise because the diesel locomotive generates exhaust gas.

Additionally, because the trolley line for supplying electric energy to the electric locomotive is located on above the containers, the rail transfer crane or the reach stacker cannot lift up the containers from the freight cars in the state where the freight cars are connected to the electric locomotive.

SUMMARY OF THE INVENTION

Accordingly, the present invention has been made in an effort to solve the above-mentioned problems occurring in the prior arts, and it is an object of the present invention to provide a moveable catenary system for carrying containers using an electric container freight train, which can reduce a period of time to move freight cars of the electric container freight train alongside a freight platform and to load the containers onto the freight cars of the freight train or unload the containers from the freight cars and can simplify the rail track arrangement.

It is another object of the present invention to provide a moveable catenary system for carrying containers using an electric container freight train, which does not use a diesel locomotive to move the freight cars to the freight platform.

To achieve the above objects, the present invention provides a moveable catenary system for carrying containers using an electric container freight train, including: a main rail track; a plurality of catenary masts installed beside the main rail track along the main rail track; a fixed catenary located above the main rail track along the main rail track, the fixed catenary having a partially broken section; fixed support units respectively joined and fixed to some of the plural catenary masts in a cantilever form for supporting the fixed catenary; a moveable catenary located at the broken section of the fixed catenary; vertical driving support units respectively joined to some of the plural catenary masts in the cantilever form for lifting up the moveable catenary toward the catenary masts or lowering the moveable catenary toward the fixed catenary while moving vertically to keep horizontality or perpendicularity relative to one side; and switching units for connecting the moveable catenary with the fixed catenary or disconnecting the moveable catenary from the fixed catenary while the moveable catenary moves vertically.

Each of the vertical driving support units includes: a base member joined and fixed to the catenary masts; a cantilever member having one end portion joined to the base member in a vertically rotatable manner, the cantilever member being electrically insulated; a trolley line fixing unit joined to the other end portion of the cantilever member; and a driving unit for rotating the cantilever member.

When the vertical driving support units are located horizontally, both end portions of the moveable catenary and a cut end portion of the fixed catenary are overlapped with each other at a predetermined length.

Both end portions of the moveable catenary are respectively bent and the cut end portions of the fixed catenary are respectively bent, the length of the bent portion of the moveable catenary is shorter than the length of the overlapped portion and the length of the bent portion of the fixed catenary is shorter than the length of the overlapped portion.

The driving unit includes: a driving motor for generating a rotational force; and a decelerator for transferring the rotational force of the driving motor to the cantilever member by decelerating a rotational speed of the driving motor.

The switching unit includes: a curved terminal joined to an end portion of the moveable catenary; a plurality of guide bolts joined to the cut end portion of the fixed catenary; springs respectively inserted into the guide bolts; and a plate type terminal supported by elasticity of the springs and joined with the guide bolts in such a way as to be vertically moveable as long as a set distance.

In another aspect of the present invention, the present invention provides a moveable catenary system for carrying containers using an electric container freight train including: a main rail track; a plurality of catenary masts installed beside the main rail track along the main rail track; a fixed catenary located above the main rail track along the main rail track, the fixed catenary having a partially broken section; fixed support units respectively joined and fixed to some of the plural catenary masts in a cantilever form for supporting the fixed catenary; a plurality of moveable catenaries located at the broken section of the fixed catenary; vertical driving support units respectively joined to some of the plural catenary masts in the cantilever form for lifting up the moveable catenary toward the catenary masts or lowering the moveable catenary toward the fixed catenary while moving vertically to keep horizontality or perpendicularity relative to one side; a first switching unit for electrically connecting the neighboring moveable catenaries with each other when the vertical driving support units are located horizontally; and a second switching unit for electrically connecting or disconnecting the moveable catenaries and the fixed catenary according to a vertical movement of the moveable catenaries.

According to the present invention, in the state where the electric container freight train moves along the main rail track and stops beside the freight platform, because the electric container freight train travels along the main rail track directly after the containers are loaded onto or unloaded from the freight cars of the electric container freight train, the moveable catenary system of the present invention can reduce the period of time to load or unload the containers onto or from the freight cars and simplify the rail track arrangement.

Therefore, the arrangement of rails of the track is simplified and the area of the land to install the rails is reduced. Accordingly, the present invention can reduce system installation costs.

Furthermore, the moveable catenary system according to the present invention does not need the diesel locomotive for moving the freight cars, and hence, can prevent air pollution and noise.

DETAILED DESCRIPTION OF THE INVENTION

Reference will be now made in detail to the preferred embodiment of the present invention with reference to the attached drawings.

Figure 1:
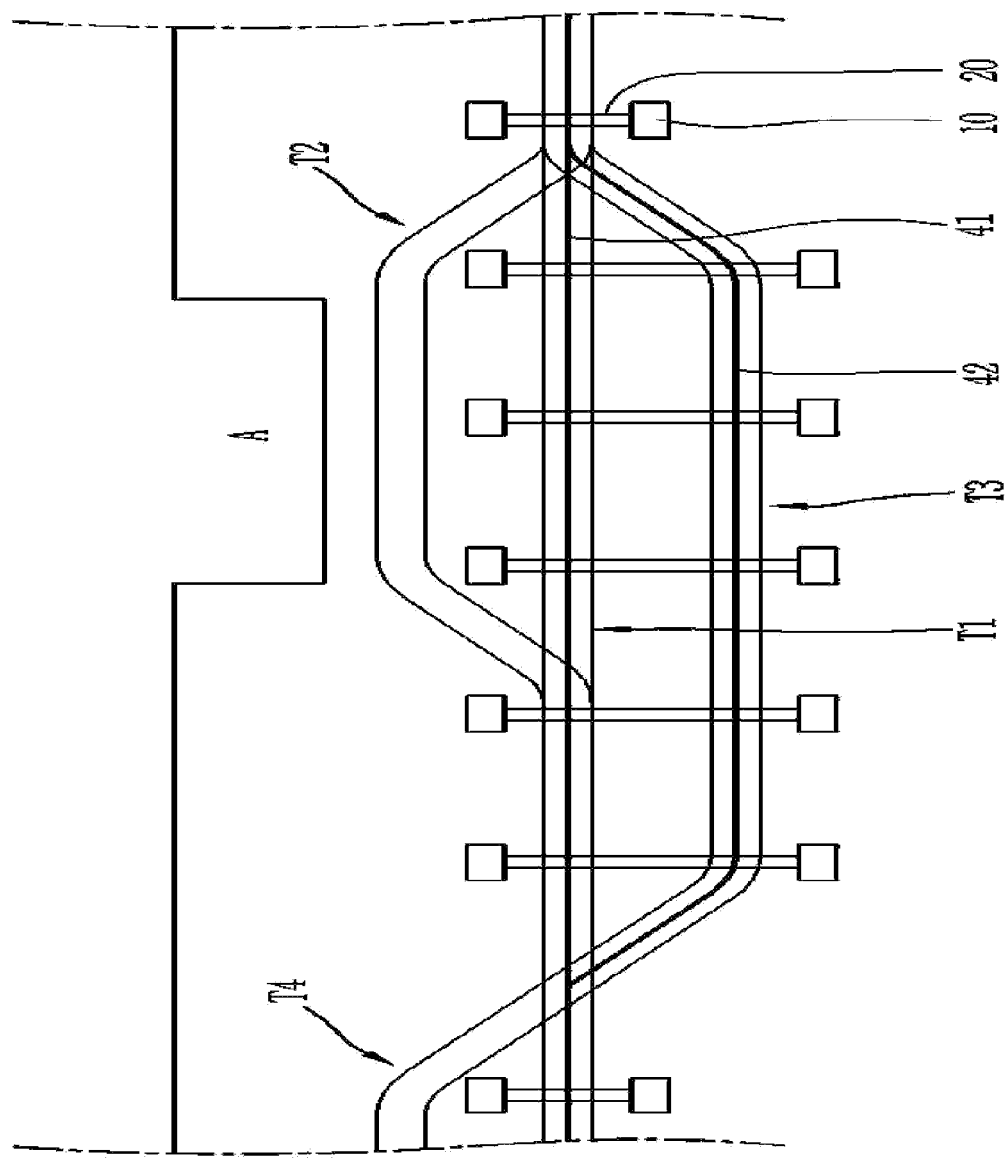
FIG. 1 is a plan view of a container carrying system using an electric container freight train according to a prior art.
Figure 2:
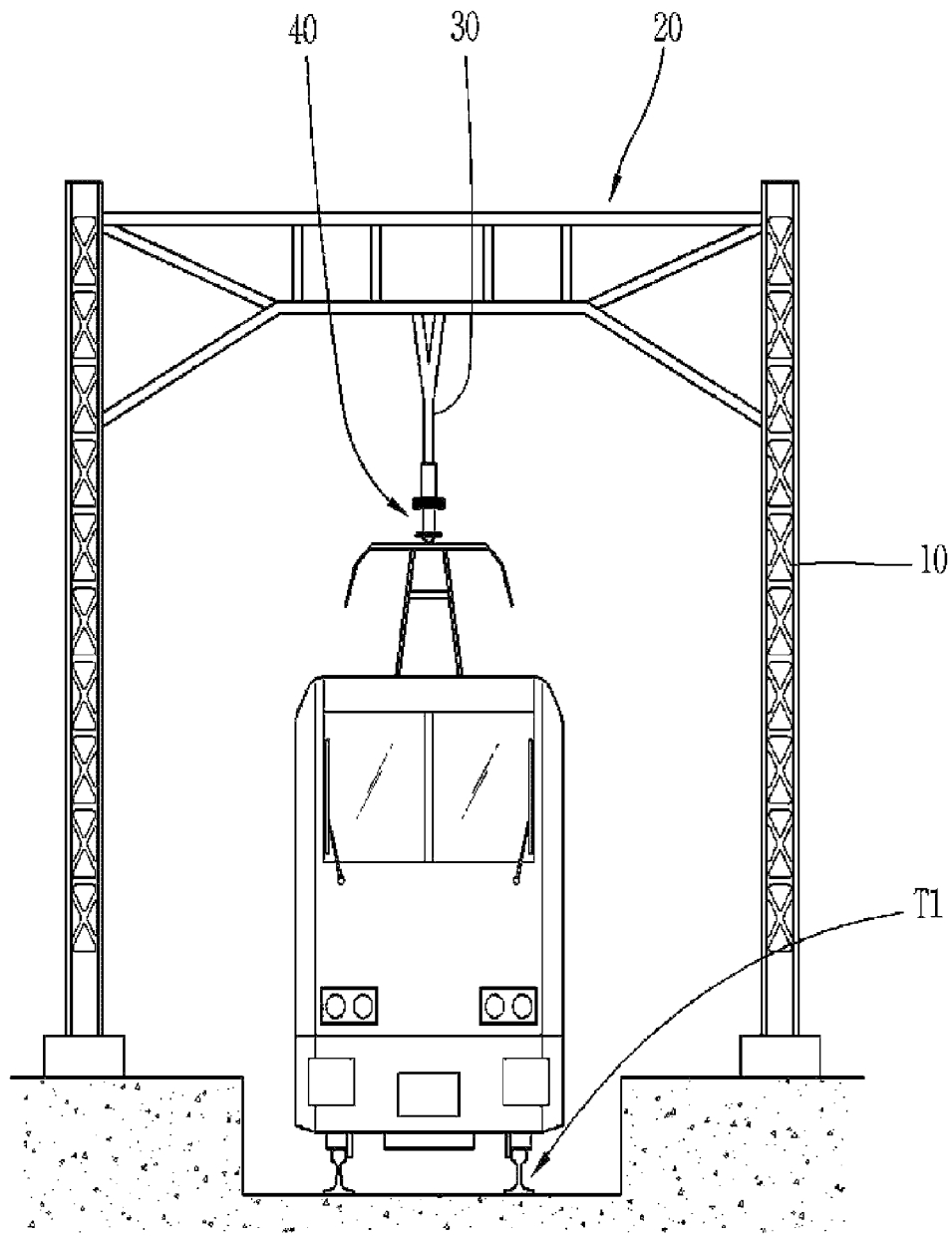
FIG. 2 is a front view showing the electric container freight train located on the container carrying system according to the prior art.
Figure 3:
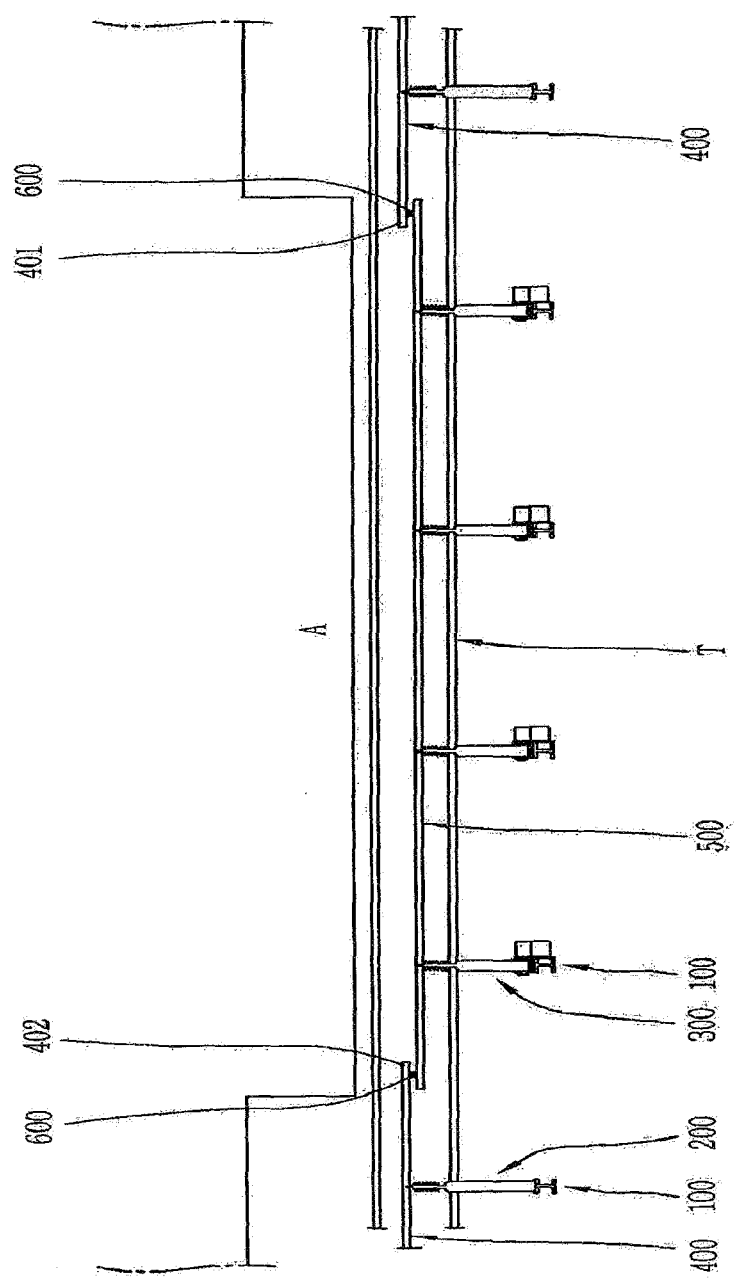
FIG. 3 is a plan view of a moveable catenary system for carrying containers using an electric container freight train according to a first preferred embodiment of the present invention.
Figure 4:
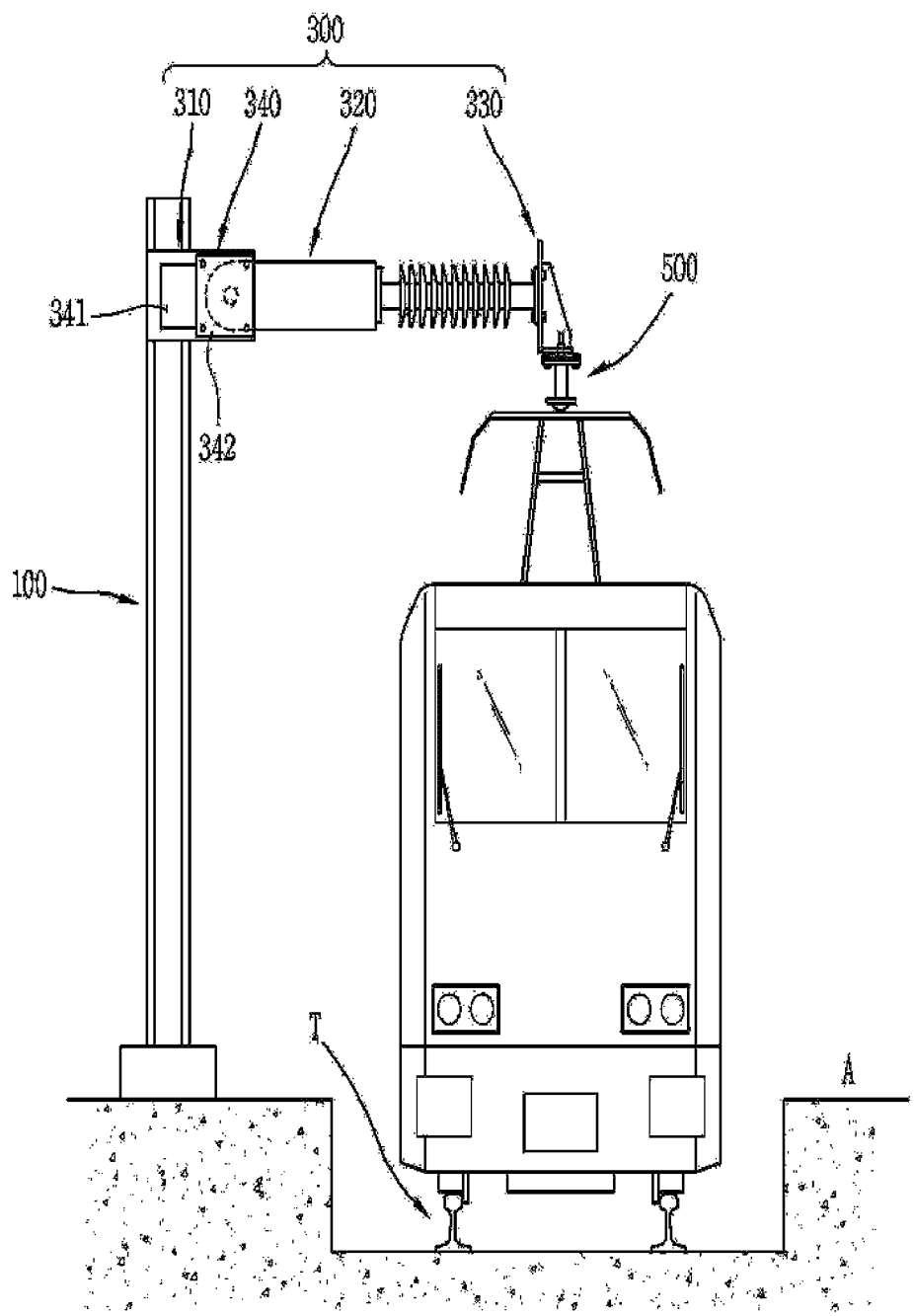
FIG. 4 is a rear view of the electric container freight train located on the moveable catenary system for carrying containers according to the first preferred embodiment of the present invention.

FIG. 3 is a plan view of a moveable catenary system for carrying containers using an electric container freight train according to a first preferred embodiment of the present invention, and FIG. 4 is a rear view of the electric container freight train located on the moveable catenary system for carrying containers according to the first preferred embodiment of the present invention.

As shown in FIGS. 3 and 4, the moveable catenary system for carrying containers using the electric container freight train according to the first preferred embodiment of the present invention includes a main rail track T, catenary masts 100, fixed support units 200, vertical driving support units 300, a fixed catenary 400, a moveable catenary 500, and a switching unit 600.

A freight platform A is located near by the main rail track T. The main rail track T includes two rails on which the electric container freight train travels.

A plurality of the catenary masts 100 are arranged at one side of the main rail track T along the main rail track T.

The catenary masts 100, which are opposed to the freight platform A and located at an area having the length corresponding to the freight platform A, are called the first catenary mast group, and the other catenary masts 100 excepting the first catenary mast group are called the second catenary mast group.

The fixed support units 200 are joined and fixed to the catenary masts 100 of the second catenary mast group in a cantilever form.

Figure 5:
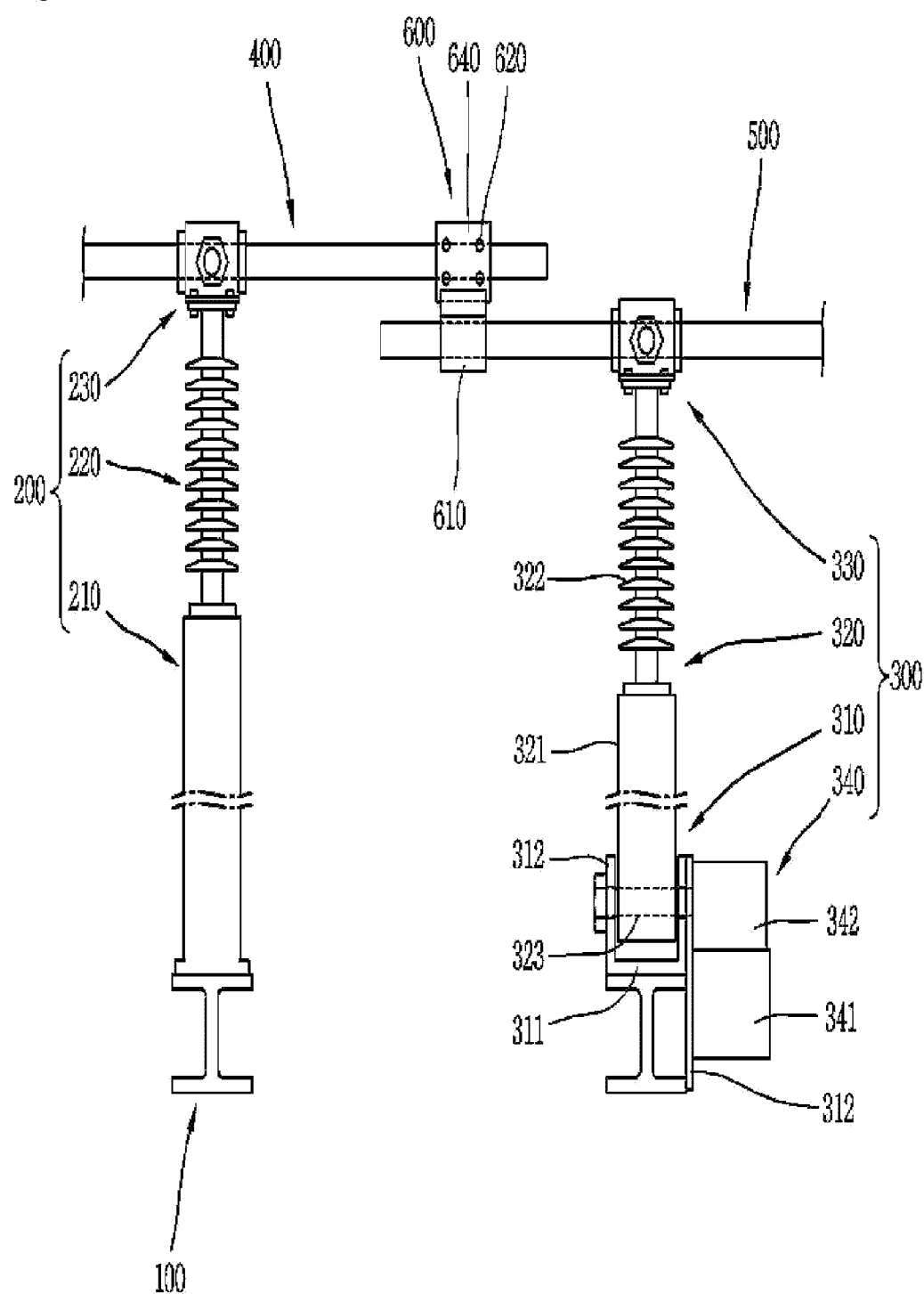
FIG. 5 is a plan view showing a fixed support unit and a vertically movable support unit of the moveable catenary system for carrying containers using the electric container freight train according to the first preferred embodiment of the present invention.

As an example, as shown in FIG. 5, each of the fixed support unit 200 includes: a body 210 having a predetermined length and being joined and fixed to an upper portion of the catenary mast 100 at one side; an insulated shaft 220 made of an insulating material and joined to the other side of the body 210; and a trolley line fixing unit 230 joined to an end of the insulating shaft 220.

The vertical driving support units 300 are respectively joined to the catenary masts 100 of the first catenary mast group in the cantilever form and in a vertically rotatable manner.

As an example, as shown in FIG. 5, each of the vertical driving support units 300 includes: a base member 310 joined and fixed to the catenary masts 100; a cantilever member 320 having one end portion joined to the base member 310 in a vertically rotatable manner, the cantilever member 320 being electrically insulated; a trolley line fixing unit 330 joined to the other end portion of the cantilever member 320; and a driving unit 340 for rotating the cantilever member 320.

The base member 310 includes a rectangular rear plate 311 fixed to the catenary mast 100, and both side plates 312 respectively extending from both sides of the front face of the rear plate 311 and respectively having through holes formed therein.

The base member 310 may further include a bottom plate extending from a lower end portion of the front face of the rear plate 311.

The cantilever member 320 has a predetermined length and includes a body 321 having a through hole at an end portion and an insulated shaft 322 joined to the other end of the body 321 and being made of an insulating material.

One end portion of the body of the cantilever member 320 is inserted between both side plates 312 of the base member 310 in such a fashion that the through hole of the body of the cantilever member 320 corresponds with the through holes of the both side plates 312.

A hinge shaft 323 penetrates the through holes of the both side plates 312 and the through hole of the body 321, so that the side plates 312 and the body 321 are joined together.

The trolley line fixing unit 330 is joined to an end portion of the insulated shaft of the cantilever member 320.

The driving unit 340 includes a driving motor 341 for generating a rotational force, and a decelerator 342 for transferring the rotational force of the driving motor 341 to the cantilever member 320 by decelerating a rotational speed of the driving motor 341.

It is preferable that the driving motor 341 is joined and fixed to the catenary mast 100 or the base member 310.

It is preferable that the decelerator 342 is joined and fixed to the outer face of the side plate 312 of the base member 310.

The decelerator 342 is connected with one end portion of the hinge shaft 323 penetrating the through holes of the both side plates 312 of the base member 310 and the through hole of the body of the cantilever member 320.

It is preferable that a male screw portion is disposed at the other end portion of the hinge shaft 323 and a nut is fastened to the male screw portion.

In this instance, the hinge shaft 323 and the body 321 of the cantilever member 320 are joined with each other by a key or others in such a way as not to do a relative motion.

A bush or a radial bearing is joined between the outer circumferential surface of the hinge shaft 323 and the inner circumferential surfaces of the through holes of the side plates 312, so that the hinge shaft 323 and the side plates 312 can do the relative motion.

When the driving motor 341 is operated, the rotational force of the driving motor 341 is transferred to the hinge shaft 323 through a transmission 342, so that the hinge shaft 323 is rotated.

When the hinge shaft 323 is rotated, the cantilever member 320 is also rotated relative to the hinge shaft 323. When the driving motor 341 generates forward or reverse rotational force, the cantilever member 320 is rotated vertically.

The fixed catenary 400 is joined to the fixed support units 200 in such a way as to be located above the main rail tracks T along the main rail track T, but in this instance, a section where the vertical driving support units 300 are located is broken.

If a position between the rightmost vertical driving support unit 300 out of the vertical driving support units 300 and the fixed support unit 200 adjacent to the rightmost vertical driving support unit 300 is called a first position and a position between the leftmost vertical driving support unit 300 out of the vertical driving support units 300 and the fixed support unit 200 adjacent to the leftmost vertical driving support unit 300 is called a second position, an area between the first position and the second position is called the section where the vertical driving support units 300 are located.

The fixed catenary 400 is joined to the trolley line fixing units 230 of the fixed support units 200.

A cut end portion of the fixed catenary 400 adjacent to the rightmost vertical driving support unit 300 is called a first end portion 401, and a cut end portion of the fixed catenary 400 adjacent to the leftmost vertical driving support unit 300 is called a second end portion 402.

The moveable catenary 500 is a little longer than the section that the vertical driving support units 300 are located, and is joined to the trolley line fixing units 330 of the vertical driving support units 300.

The moveable catenary 500 performs a circular motion in a vertical direction along a vertical rotation of the vertical driving support units 300.

Figure 6:
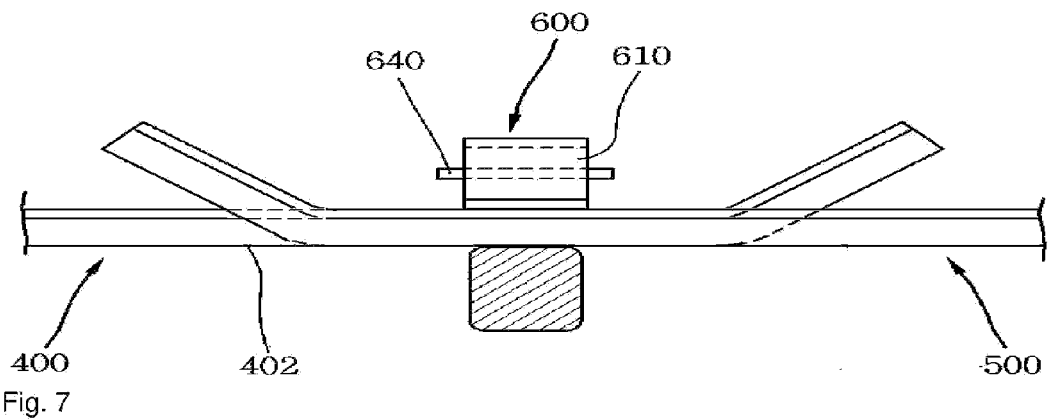
FIG. 6 is a side view showing a moveable catenary and a fixed catenary of the moveable catenary system for carrying containers using the electric container freight train according to the first preferred embodiment of the present invention.

When the vertical driving support units 300 are located in an approximately horizontal direction, namely, when the vertical driving support units 300 are approximately perpendicular to the catenary masts, as shown in FIGS. 5 and 6, both end portions of the moveable catenary 500 and the first and second end portions 401 and 402 of the fixed catenary 400 are overlapped at regular intervals.

Moreover, both ends of the moveable catenary 500 are respectively bent, and the first end portion 401 and the second end portion 402 of the fixed catenary 400 are respectively bent at their ends.

The length of the bent portion of the moveable catenary 500 is shorter than the length of the overlapped portion of the fixed catenary 400. Furthermore, the length of the bent portions of the first end portion 401 and the second end portion 402 of the fixed catenary 400 is shorter than the length of the overlapped portion of the moveable catenary 500.

In the first preferred embodiment of the switching unit 600, when the vertical driving support units 300 are located horizontally, they electrically connect the moveable catenary 500 and the fixed catenary 400 with each other.

Figure 7:
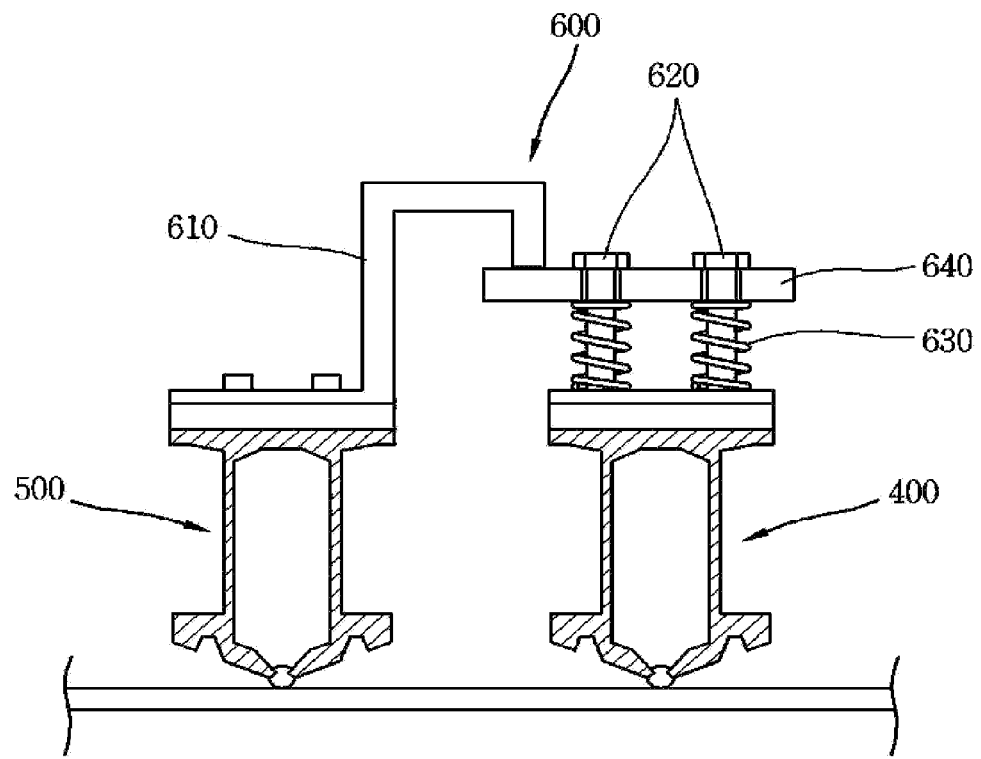
FIG. 7 is a front view showing a switching unit of the moveable catenary system for carrying containers using the electric container freight train according to the first preferred embodiment of the present invention.

As an example of the switching unit 600, as shown in FIG. 7, the switching unit 600 includes: a curved terminal 610 joined to an end portion of the moveable catenary 500; a plurality of guide bolts 620 joined to the cut end portion of the fixed catenary 400; springs 630 respectively inserted into the guide bolts 620; and a plate type terminal 640 supported by the springs 630 and joined with the guide bolts 620 in such a way as to be vertically moveable as long as a set distance.

It is preferable that the number of the guide bolts 620 is four.

Each of the guide bolts 620 includes a male screw portion disposed at one end portion and a head portion disposed at the other end portion.

The guide bolts 620 are respectively inserted into through holes formed in the plate type terminal 640, and the springs 630 are respectively inserted into the guide bolts 620. The male screw portions of the guide bolts 620 are joined to the upper face of the fixed catenary 400.

The bottom face of the plate type terminal 640 is supported by the springs 630 and the upper face of the plate type terminal 640 is supported by the head portions of the guide bolts 620.

When external force is applied to the upper face of the plate type terminal 640, the plate type terminal 640 moves downward while being supported by elastic force of the springs 630.

When the vertical driving support units 300 are located horizontally, the curved terminal 610 mounted on the moveable catenary 500 presses the upper face of the plate type terminal 640, so that the curved terminal 610 and the plate type terminal 640 get in contact with each other.

Figure 8:
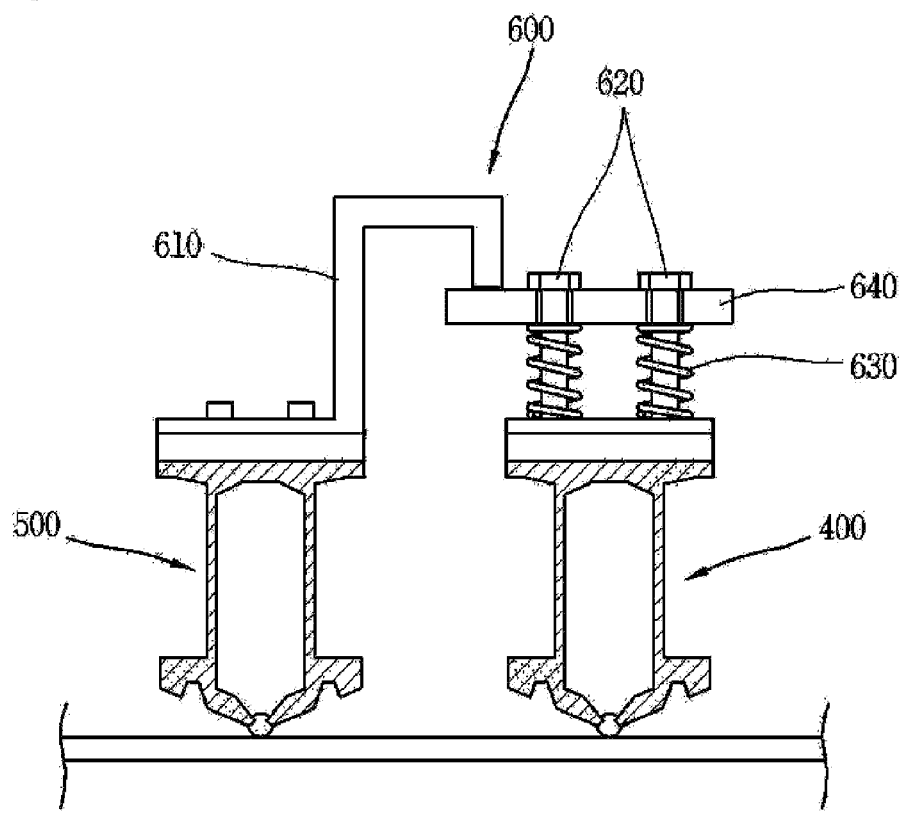
FIG. 8 is a front view showing another example of the switching unit of the moveable catenary system for carrying containers using the electric container freight train according to the first preferred embodiment of the present invention.

As another example of the switching unit, as shown in FIG. 8, the switching unit 600 includes: a curved fixed bracket 650 having a through hole and being joined and fixed to the upper face of the fixed catenary 400; a shaft 660 penetrating the through hole of the curved fixed bracket 650 and joined to the curved fixed bracket 650; a plate type terminal 670 joined to an end portion of the shaft 660; a spring 680 joined to the shaft 660 and located between the plate type terminal 670 and one side of the curved fixed bracket 650; and a curved terminal 690 joined to the moveable catenary 500 and getting in contact with the plate type terminal 670.

The shaft 660 includes a stepped portion 661 formed at one side end thereof and supported on one side of the curved fixed bracket 650.

The plate type terminal 670 has the form that an upper portion of the plate is bent.

When the plate type terminal 670 is pressed in a horizontal direction, the plate type terminal 670 and the shaft 660 are moved while receiving the elastic force of the spring 680.

The curved terminal 690 has the form that a plate is bent several times, and has one end portion joined and fixed to the moveable catenary 500 and the other end portion which is curved.

When the vertical driving support units 300 are located horizontally, the curved terminal 690 and the plate type terminal 670 get in contact with each other while one side of the curved terminal 690 mounted on the moveable catenary 500 presses one side of the plate type terminal 640 in a horizontal direction.

Figure 9:
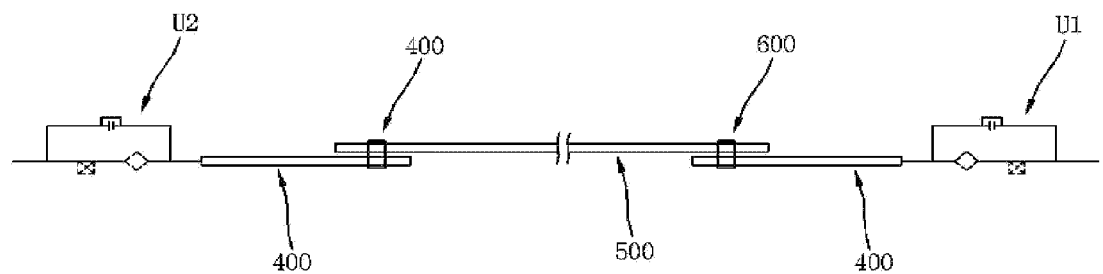
FIG. 9 is a plan view showing a power cut-off and connection device of the moveable catenary system for carrying containers using the electric container freight train according to the first preferred embodiment of the present invention.

In the meantime, as shown in FIG. 9, a first power cut-off and connection unit U1 and a second power cut-off and connection unit U2 for cutting off power from the fixed catenary 400 of the first end portion 401 and the fixed catenary 400 of the second end portion 402 or connecting power to the fixed catenary 400 of the first end portion 401 and the fixed catenary 400 of the second end portion 402 are provided.

When the fixed catenary 400 and the moveable catenary 500 are disconnected, first the first power cut-off and connection unit U1 and the second power cut-off and connection unit U2 are electrically cut off from each other, and then, the moveable catenary 500 and the fixed catenary 400 are electrically cut off.

Figure 10:
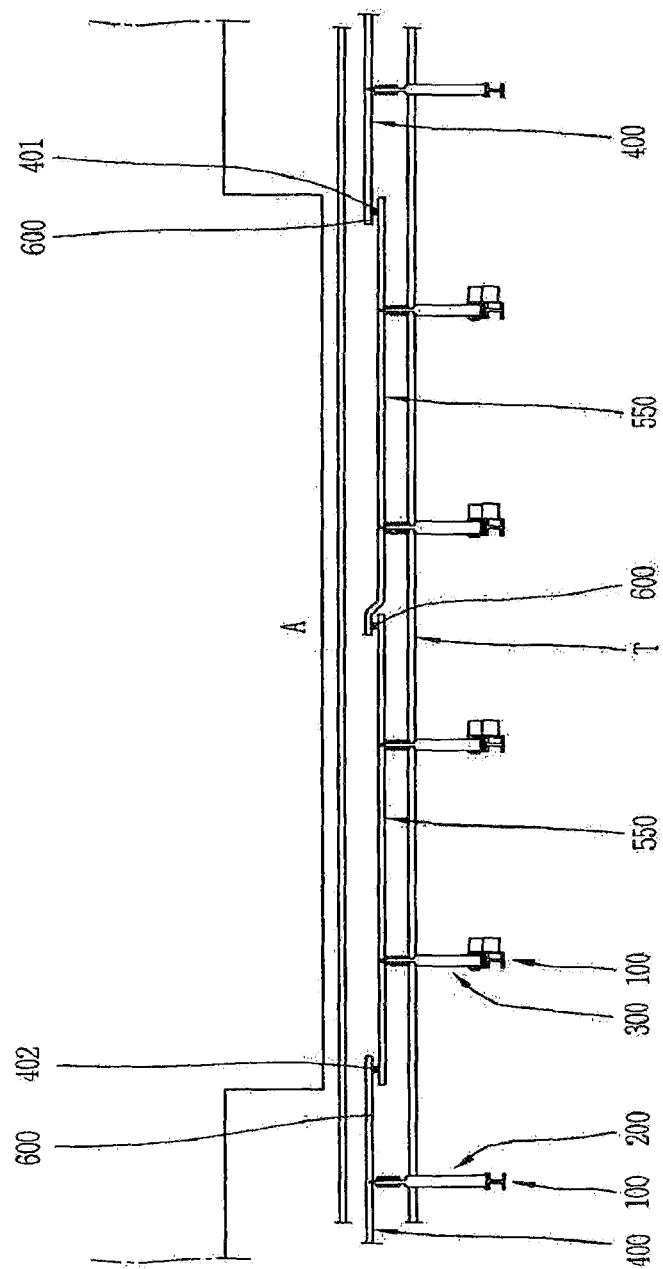
FIG. 10 is a plan view of a moveable catenary system for carrying containers using an electric container freight train according to a second preferred embodiment of the present invention.
Figure 11:
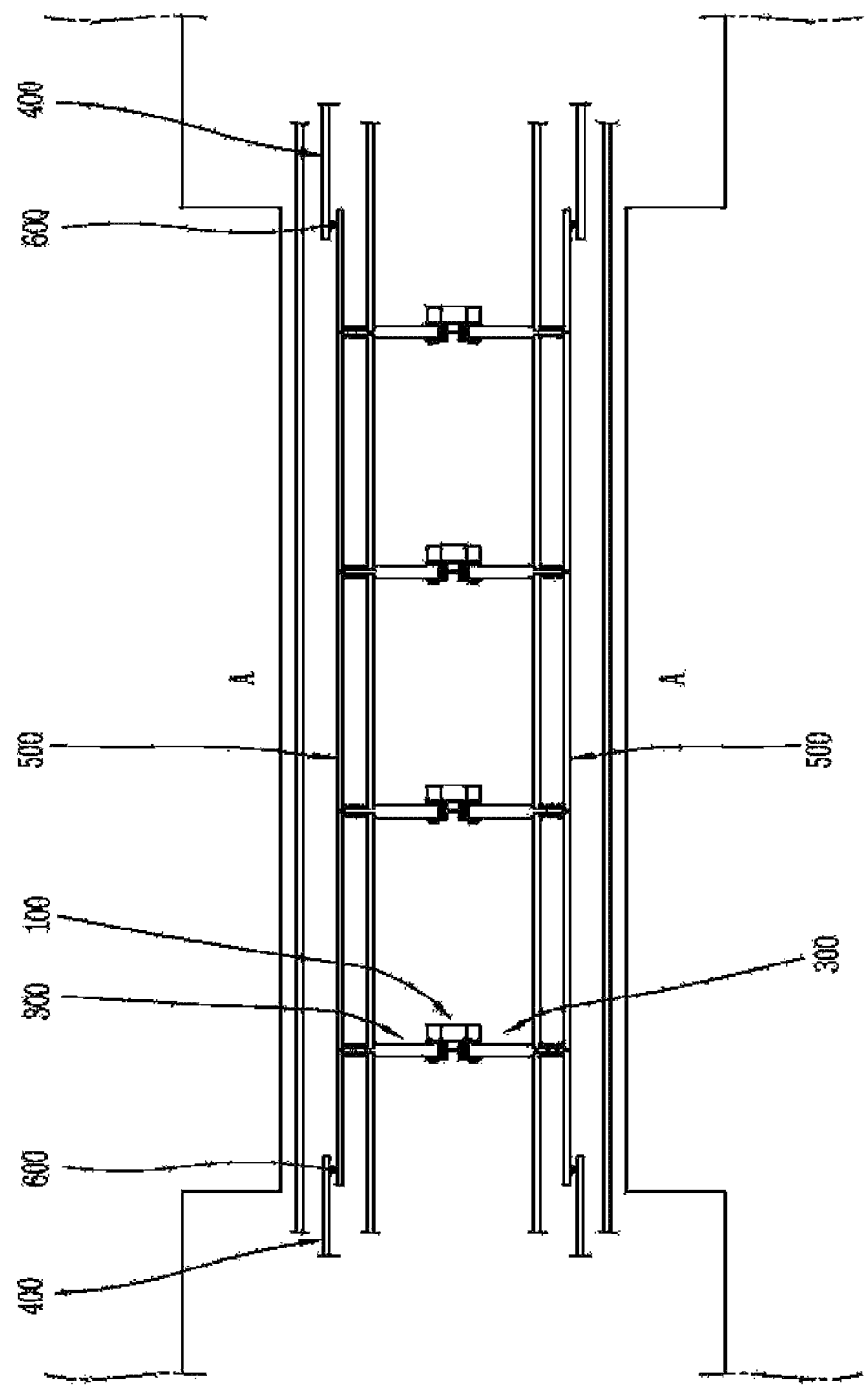
FIG. 11 is a plan view of a moveable catenary system for carrying containers using an electric container freight train according to a third preferred embodiment of the present invention.
Figure 12:
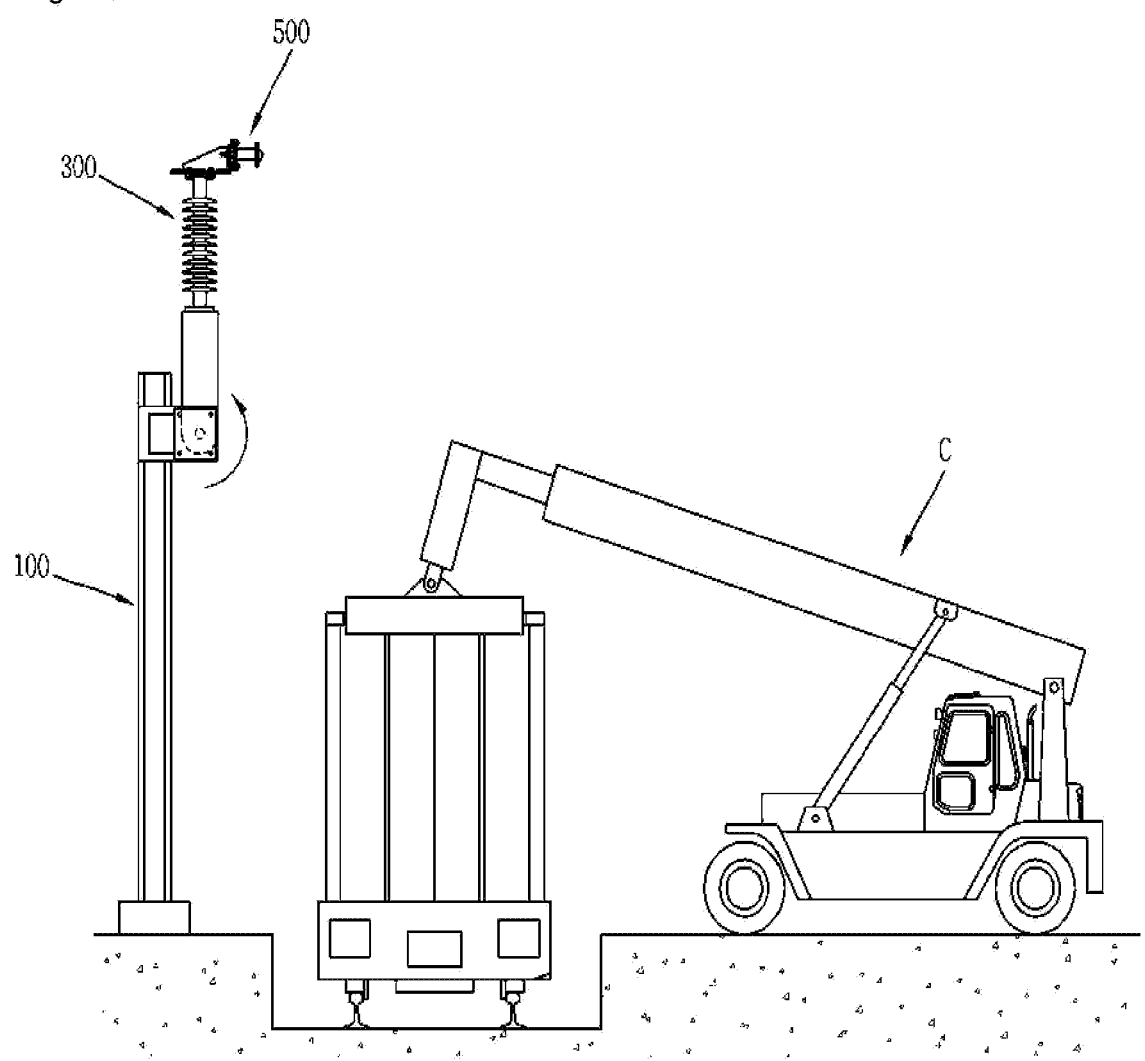
FIG. 12 is a side view showing an operation of the moveable catenary system for carrying containers using the electric container freight train according to the present invention.

FIG. 10 is a plan view of a moveable catenary system for carrying containers using an electric container freight train according to a second preferred embodiment of the present invention.

As shown in FIG. 10, the moveable catenary system for carrying containers using the electric container freight train according to the second preferred embodiment of the present invention includes a main rail track T, a plurality of catenary masts 100, fixed support units 200, vertical driving support units 300, a fixed catenary 400, a plurality of moveable catenaries 550, a first switching units 600, and a second switching units 600.

The main rail track T, the catenary masts 100, the fixed support units 200, the vertical driving support units 300, and the fixed catenary 400 are equal to the main rail track T, the catenary masts 100, the fixed support units 200, the vertical driving support units 300, and the fixed catenary 400 of the first preferred embodiment.

Accordingly, detailed description of the main rail track T, the catenary masts 100, the fixed support units 200, the vertical driving support units 300, and the fixed catenary 400 will be omitted.

The plural moveable catenaries 550 adopt the form that the moveable catenary 500 of the first preferred embodiment is divided into several parts.

For instance, when there are two moveable catenaries 500, the moveable catenary 500 of the first preferred embodiment is divided into halves.

In more detail, while four vertical driving support units 300 are joined to the moveable catenary 500 in the first preferred embodiment, in the second preferred embodiment, the moveable catenary 500 is divided into halves, and one of the two moveable catenaries 550 is joined to two vertical driving support units 300 and the other one is joined to the other two vertical driving support units 300.

In the second preferred embodiment, it is preferable that the two moveable catenaries 550 respectively have an extended end portion in such a fashion that the end portions of the two moveable troll lines 550 are overlapped.

The first switching unit 600 electrically connects the neighboring moveable catenaries 550 with each other when the vertical driving support units 300 are located horizontally.

The first switching unit 600 is equal to the switching unit 600 of the first preferred embodiment. In the case that there are two moveable catenaries 550, one first switching unit 600 is needed.

The second switching unit 600 electrically connects the moveable catenaries 550 and the fixed catenary 400 with each other when the vertical driving support units 300 are located horizontally. The second switching unit 600 is equal to the switching unit 600 of the first preferred embodiment.

In the moveable catenary system for carrying containers using the electric container freight train according to the second preferred embodiment, if the moveable catenary 500 of the first preferred embodiment is too long, the moveable catenary 500 is divided into a proper length.

Moreover, in a third preferred embodiment, as shown in FIG. 9, at least two moveable catenary systems for carrying containers using the electric container freight train according to the first preferred embodiment are installed side by side.

Hereinafter, actions and effects of the moveable catenary system for carrying containers using the electric container freight train according to the present invention will be described as follows.

First, containers are loaded on freight cars of the electric container freight train.

The electric container freight train on which the containers are loaded travels along the main rail track T, and then, stops when it is located beside the freight platform A.

As shown in FIG. 10, the vertical driving support units 300 are rotated at 90 degrees so that they are in a horizontal state.

When the vertical driving support units 300 are rotated at degrees, the moveable catenary 500 joined to the vertical driving support units 300 are spaced apart from the fixed catenary 400 and perform a circular movement at 90 degrees.

That is, the vertical driving support units 300 lift up the moveable catenary 500 toward the catenary masts 100.

A reach stacker C, which is located on the freight platform A, picks up the container loaded on the freight cars and moves to a container yard, and then, loads the containers on the container yard.

When all of the containers loaded on the freight cars of the electric container freight train are unloaded, the vertical driving support units 300 are rotated at 90 degrees so that they are in the horizontal state. In other words, the vertical driving support units 300 lift up the moveable catenary 500 toward the catenary masts 100, and then, lower the moveable catenary 500 toward the fixed catenary 400.

While the vertical driving support units 300 are in the horizontal state, the curved terminal 610 and the plate type terminal 640 of the switching unit 600 get in contact with each other, so that the moveable catenary 500 and the fixed catenary 400 are connected.

The electric container freight train travels along the main rail track T by receiving electric energy through the fixed catenary 400 and the moveable catenary 500.

In the case that the containers loaded on the container yard are loaded on the freight cars of the electric container freight train, the electric container freight train stops beside the freight platform A, and then, the containers are loaded on the freight cars of the electric container freight train or are unloaded from the freight cars, whereby the moveable catenary system according to the present invention can reduce the period of time to load and unload the containers.

Furthermore, after the electric container freight train moves along the main rail track T and stops beside the freight platform A, the containers are loaded on or unloaded from the freight cars of the electric container freight train, and then, the electric container freight train moves along the main rail track A. Accordingly, the moveable catenary system according to the present invention has a simplified track arrangement.

In other words, the present invention does not need the train standby rail track and the freight loading rail track, which are used in the prior arts.

Therefore, the moveable catenary system according to the present invention can simplify arrangement of rails of the track and reduce an area of the site where the rails are installed so as to reduce system installation costs.

Additionally, the moveable catenary system according to the present invention can prevent air pollution and noise because it does not need the diesel locomotive.

The invention claimed is:

1. A moveable catenary system for carrying containers using an electric container freight train comprising:
   a main rail track;
   a plurality of catenary masts installed beside the main rail track along the main rail track;
   a fixed catenary located above the main rail track along the main rail track, the fixed catenary having a partially broken section;
   fixed support units respectively joined and fixed to some of the plural catenary masts in a cantilever form for supporting the fixed catenary;
   a moveable catenary located at the broken section of the fixed catenary;
   vertical driving support units respectively joined to some of the plural catenary masts in the cantilever form for lifting up the moveable catenary toward the catenary masts or lowering the moveable catenary toward the fixed catenary while moving vertically to keep horizontality or perpendicularity relative to one side; and switching units for connecting the moveable catenary with the fixed catenary or disconnecting the moveable catenary from the fixed catenary while the moveable catenary moves vertically, wherein each of the switching units comprises:

a plurality of guide bolts joined to a cut end portion of the fixed catenary;

springs respectively inserted into the guide bolts;

a plate type terminal supported by the springs and joined with the guide bolts in such a way as to vertically move as long as a set distance; and a curved terminal joined to an end portion of the moveable catenary and being in contact with the plate type terminal or being separated from the plate type terminal according to the vertical movement of the moveable catenary.

2. The moveable catenary system according to claim 1, wherein each of the vertical driving support units comprises:

a base member joined and fixed to the catenary masts;

a cantilever member having one end portion joined to the base member in a vertically rotatable manner, the cantilever member being electrically insulated;

a trolley line fixing unit joined to the other end portion of the cantilever member; and a driving unit for rotating the cantilever member.

3. The moveable catenary system according to claim 2, wherein the driving unit comprises:

a driving motor for generating a rotational force; and a decelerator for transferring the rotational force of the driving motor to the cantilever member by decelerating a rotational speed of the driving motor.

4. The moveable catenary system according to claim 1, wherein when the vertical driving support units are located horizontally, both end portions of the moveable catenary and a cut end portion of the fixed catenary are overlapped with each other at a predetermined length.

5. The moveable catenary system according to claim 4, wherein both end portions of the moveable catenary are respectively bent and the cut end portions of the fixed catenary are respectively bent, the length of the bent portion of the moveable catenary is shorter than the length of the overlapped portion and the length of the bent portion of the fixed catenary is shorter than the length of the overlapped portion.

6. A moveable catenary system for carrying containers using an electric container freight train comprising:

a main rail track;

a plurality of catenary masts installed beside the main rail track along the main rail track;

a fixed catenary located above the main rail track along the main rail track, the fixed catenary having a partially broken section;

fixed support units respectively joined and fixed to some of the plural catenary masts in a cantilever form for supporting the fixed catenary;

a moveable catenary located at the broken section of the fixed catenary;

vertical driving support units respectively joined to some of the plural catenary masts in the cantilever form for lifting up the moveable catenary toward the catenary masts or lowering the moveable catenary toward the fixed catenary while moving vertically to keep horizontality or perpendicularity relative to one side; and switching units for connecting the moveable catenary with the fixed catenary or disconnecting the moveable catenary from the fixed catenary while the moveable catenary moves vertically, wherein each of the switching units comprises:

a curved fixed bracket joined and fixed to the fixed catenary;

a shaft penetrating the curved fixed bracket and being joined to the curved fixed bracket;

a plate type terminal joined to an end portion of the shaft;

a spring joined to the shaft and located between the plate type terminal and one side of the curved fixed bracket; and a curved terminal joined to an end portion of the moveable catenary, the curved terminal being in contact with the plate type terminal or being separated from the plate type terminal according to the vertical movement of the moveable catenary.

7. A moveable catenary system for carrying containers using an electric container freight train comprising:

a main rail track;

a plurality of catenary masts installed beside the main rail track along the main rail track;

a fixed catenary located above the main rail track along the main rail track, the fixed catenary having a partially broken section;

fixed support units respectively joined and fixed to some of the plural catenary masts in a cantilever form for supporting the fixed catenary;

a plurality of moveable catenaries located at the broken section of the fixed catenary;

vertical driving support units respectively joined to some of the plural catenary masts in the cantilever form for lifting up the moveable catenary toward the catenary masts or lowering the moveable catenary toward the fixed catenary while moving vertically to keep horizontality or perpendicularity relative to one side;

a first switching unit for electrically connecting the neighboring moveable catenaries with each other when the vertical driving support units are located horizontally; and a second switching unit for electrically connecting or disconnecting the moveable catenaries and the fixed catenary according to a vertical movement of the moveable catenaries.

* * * * *